Nov. 24, 1931.   L. JAENICHEN   1,833,164
SCALE
Filed Nov. 18, 1930
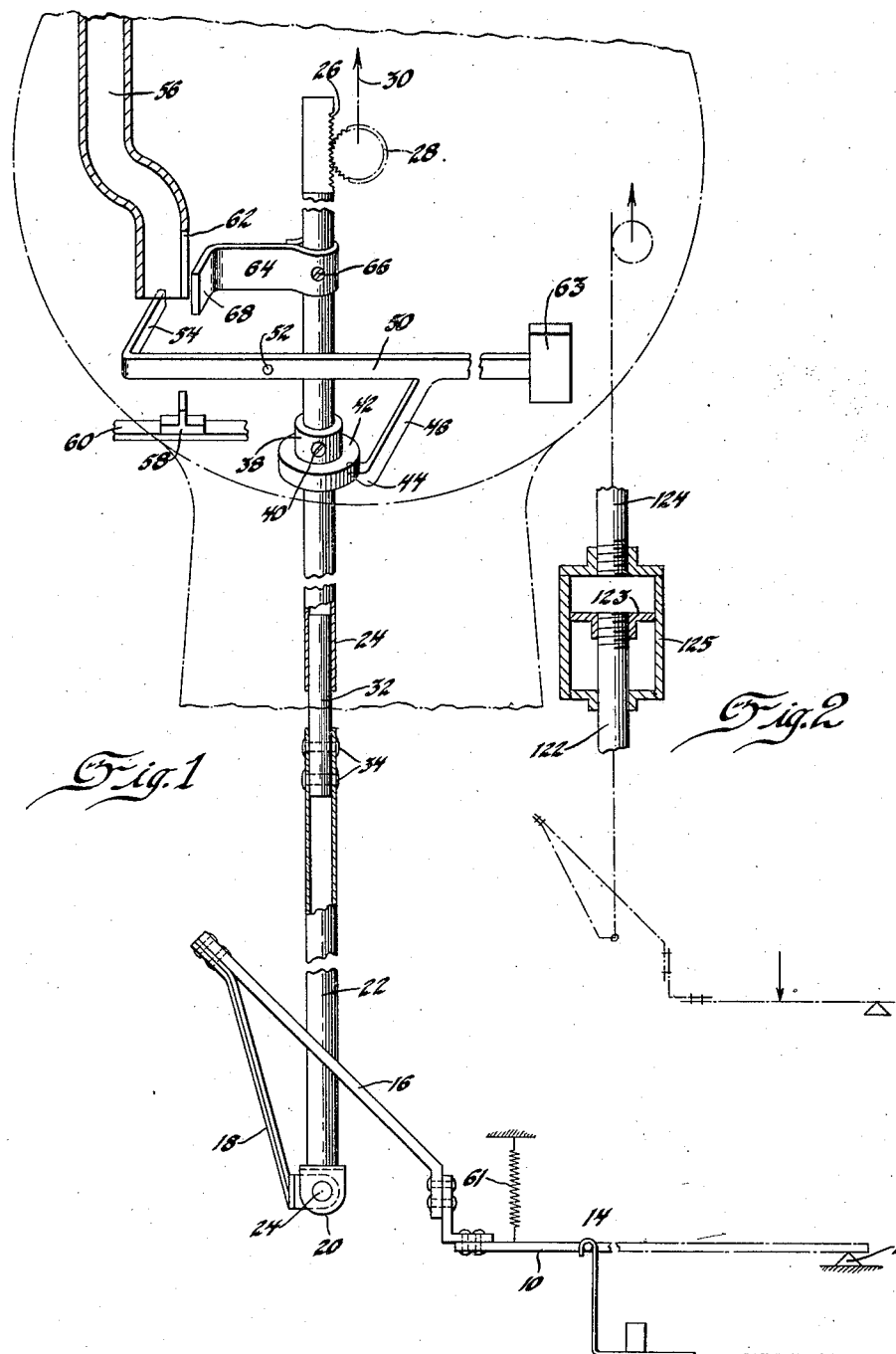

Patented Nov. 24, 1931

1,833,164

UNITED STATES PATENT OFFICE

LOUIS JAENICHEN, OF SPRINGFIELD TOWNSHIP, OAKLAND COUNTY, MICHIGAN, ASSIGNOR TO THE STANDARD COMPUTING SCALE COMPANY, OF DETROIT, MICHIGAN, A CORPORATION OF MICHIGAN

SCALE

Application filed November 18, 1930. Serial No. 496,450.

This invention relates to personal weighing scales and more particularly to indicator tripping mechanism adapted to be controlled by a coin deposited in a coin chute generally provided in such scales.

An object of this invention is a tripping mechanism for scales of this character which is operable to permit the scale indicating means to operate positively and only upon the insertion of a coin in the chute provided for such purposes.

A still further object is a personal weighing scale having a positive operating tripping mechanism for permitting the indicator to read only when a coin has been dropped in the chute generally provided in such scales.

Still further objects will readily occur to those skilled in the art upon reference to the following description and the accompanying drawings in which Fig. 1 shows parts of a personal weighing scale embodying the invention.

Fig. 2 is a diagrammatic view of a modification.

Referring to Fig. 1 which shows the parts in the position they occupy when a person is standing upon the weighing platform and before a coin has been dropped in place, it will be seen that the scale includes a weighing lever 10, shown diagrammatically as mounted upon a bearing or fulcrum 12, and having a load indicated thereon at 14. One end of the lever is connected by a rigid arm 16 to a bi-metallic thermostatic element 18, which in turn is pivotally connected to the slotted end 20 of a rack rod portion 22 by means of a pivot pin 24. The rack rod includes two portions, the lower portion 22 connected to the thermostat, and the upper portion 24 provided with a rack 26 adapted to engage the gear 28 connected to the indicating needle 30, these portions of the rack rod being formed of hollow tubes.

In the upper end of the portion 22 a bar 32 is disposed, this bar being secured to the portion 22 in any suitable manner, as by the rivets 34, and being of such a size that the upper portion 24 can slide thereon with practically no friction. The upper portion of the rack rod is provided with a collar 38 secured thereto by the set screw 40 and having a flange 42 adapted to be engaged by the hook 44 formed on the end of the leg 46 of the counterweighted T-shaped tripping element 50, the latter being pivoted to the frame of the scale at the point 52. One end of the tripping element 50 is bent outwardly with respect to the major portion thereof to provide an arm 54 which is disposed below the opening in the coin chute 56 so as to be engaged by a coin which slides down the chute. A stop 58 provided on a frame part 60 is disposed below a portion of the tripping element 50 so as to limit the downward movement of the latter. The end of the element 50 may be provided with a counterweight 63 to keep the arm 54 near the bottom of the chute 56 and to keep hook 44 under collar 42.

The operation of the foregoing parts will readily be observed. With the parts in their present condition, that is to say, with a person standing upon the weighing platform and without a penny having been dropped in the slot 56, the lower portion of the rack rod is separated from the upper portion, the lower portion having been moved by the load on the weighing lever and the upper portion being held stationary by the hook 44 of the tripping element 50.

When a coin is dropped in the chute 56, it engages the arm 54 of the tripping element, causing the latter to move pivotally on the pin 52 and to move the hook 44 out from under the collar 42. Thereupon the upper portion of the rack rod can drop as permitted by the lower portion and accordingly will rotate the indicating needle 30 a distance to correspond to the effect of the load.

When a person steps off the weighing platform, the springs provided in such scales and indicated diagrammatically at 61 will pull the lower portion of the rack rod upwardly until it meets the upper portion 24. Then the springs will pull them both upwardly until the collar 42 passes above the hook 44 so as to rest thereon. The hook, it must be remembered, has assumed its position due to the fact that the coin has dropped out of the coin chute 56 thru the slot 62 in the side wall of the latter.

In order to insure the operation of the scale in the event a coin is dropped in the slot before the person steps on the weighing platform, means including an element 64 secured to the rack rod 24 by the set screw 66 is provided. The element 64 has a right angularly bent portion 68 which forms a closure for the slot 62 in the coin chute 56 so that a coin deposited in the coin chute 56 cannot move out of the chute thru the slot 62 until the rack rod and the arm 68 have been lowered to free the slot 62. This action will take place after the tripping element has been swung on its pivot by the coin and after a load has been placed on the weighing lever 14.

A modification of the invention, as shown in Fig. 2, effects a combination of the rack rod of Fig. 1 with a dash pot. The lower portion 122 of the rack rod is provided with a piston 123 on its upper end, and the upper portion 124 of the rack rod is provided on its lower end with a cylinder 125 encompassing the piston 123. The portion 122 will move with the load and the piston will slide in the cylinder, not moving the latter however. But when the trip mechanism is moved to its release position, the upper portion 124 will drop carrying with it the cylinder 125. Due to the fact that the cross sectional areas of the piston and cylinder are greater than those of the rack rod portions, a dash pot action takes place, as will be readily seen.

Now having described the invention and the preferred embodiment thereof, it is to be understood that the said invention is to be limited, not to the specific details herein set forth, but only by the scope of the claims which follow:

What I claim is:

1. In a coin control for a scale, a rack rod portion operable in response to load, a second rack rod portion operatively connected to an indicator mechanism, means normally preventing the establishment of an operative connection between the rack rod portions, said means being disposed in such relation to a coin chute that when a coin is dropped into said chute, the means operates to permit the establishing of an operative connection between the rack rod parts, said means including a collar secured to one rack rod portion, and a pivotally mounted latch adapted to engage the collar and having a part disposed in the path of drop of the coin so as to be moved to release the collar when a coin is dropped into the chute.

2. In a coin control for a scale, a rack rod portion operable in response to load, a second rack rod portion operatively connected to an indicator mechanism, means normally preventing the establishment of an operative connection between the rack rod portions, said means being disposed in such relation to a coin chute that when a coin is dropped into said chute, the means operates to permit the establishing of an operative connection between the rack rod parts, one rack rod portion having an end formed as a piston, and the other portion having an end formed as a cylinder encompassing said piston.

3. In a coin control for a scale, a rack rod portion operable in response to load, a second rack rod portion operatively connected to an indicator mechanism, means normally preventing the establishment of an operative connection between the rack rod portions, said means being disposed in such relation to a coin chute that when a coin is dropped into said chute, the means operates to permit the establishing of an operative connection between the rack rod parts, the coin chute having a slot thru which the coin may pass after it has caused release movement of the tripping mechanism, there being a closure for said slot which opens upon downward movement of that rack rod portion which is connected to the indicator, to permit the coin to move out of the chute and towards a coin receiver.

4. In a coin control for a scale, a rack rod portion operable in response to load, a second rack rod portion operatively connected to an indicator mechanism, means normally preventing the establishment of an operative connection between the rack rod portions, said means being disposed in such relation to a coin chute that when a coin is dropped into said chute, the means operates to permit the establishing of an operative connection between the rack rod parts, the coin chute having a slot thru which the coin may pass after it has caused release movement of the tripping mechanism, there being a closure for said slot which opens upon downward movement of that rack rod portion which is connected to the indicator, to permit the coin to move out of the chute and towards a coin receiver, the closure including an arm secured to the last mentioned rack rod portion.

5. In a coin control for a scale, a rack rod portion operable in response to load, a second rack rod portion operatively connected to an indicator mechanism, means normally preventing the establishment of an operative connection between the rack rod portions, said means being disposed in such relation to a coin chute that when a coin is dropped into said chute, the means operates to permit the establishing of an operative connection between the rack rod parts, said means including a collar secured to one rack rod portion, and a pivotally mounted latch adapted to engage the collar, and having a part disposed in the path of drop of the coin so as to be moved to release the collar when a coin is dropped into the chute one rack rod portion having an end formed as a piston, and the other portion having an end formed as a cylinder encompassing said piston.

6. In a coin control for a scale, a rack rod portion operable in response to load, a second rack rod portion operatively connected to an indicator mechanism, means normally preventing the establishment of an operative connection between the rack rod portions, said means being disposed in such relation to a coin chute that when a coin is dropped into said chute, the means operates to permit the establishing of an operative connection between the rack rod parts, said means including a collar secured to one rack rod portion, and a pivotally mounted latch adapted to engage the collar, and having a part disposed in the path of drop of the coin so as to be moved to release the collar when a coin is dropped into the chute, the coin chute having a slot thru which the coin may pass after it has caused release movement of the tripping mechanism, there being a closure for said slot which opens upon downward movement of that rack rod portion which is connected to the indicator, to permit the coin to move out of the chute and towards a coin receiver.

7. In a coin control for a scale, a rack rod portion operable in response to load, a second rack rod portion operatively connected to an indicator mechanism, means normally preventing the establishment of an operative connection between the rack rod portions, said means being disposed in such relation to a coin chute that when a coin is dropped into said chute, the means operates to permit the establishing of an operative connection between the rack rod parts, said means including a collar secured to one rack rod portion, and a pivotally mounted latch adapted to engage the collar, and having a part disposed in the path of drop of the coin so as to be moved to release the collar when a coin is dropped into the chute the coin chute having a slot thru which the coin may pass after it has caused release movement of the tripping mechanism, there being a closure for said slot which opens upon movement of that rack rod portion which is connected to the indicator, to permit the coin to move out of the chute and towards a coin receiver, the closure including an arm secured to the last mentioned rack rod portion.

8. In a coin control for a scale, an element operable in response to load, a rack rod operatively connected to an indicator mechanism, means normally preventing the establishment of an operative connection between the element and the rack rod, said means being disposed in such relation to the coin chute that when a coin is dropped into said chute it causes the means to operate to permit the establishing of an operative connection between the element and the rack rod, said means including a collar secured to the rack rod, and a pivotally mounted latch adapted to engage the collar and having a part disposed in the path of drop of the coin so as to be moved to release the collar when a coin is dropped into the chute.

LOUIS JAENICHEN.